United States Patent
Bruhn

[11] Patent Number: 5,808,394
[45] Date of Patent: Sep. 15, 1998

[54] CARBON BRUSH FOR AN ELECTRIC MOTOR

[75] Inventor: Rainer Bruhn, Karlsruhe, Germany

[73] Assignee: ITT Automotive Europe GmbH, Germany

[21] Appl. No.: 604,938

[22] PCT Filed: Aug. 30, 1994

[86] PCT No.: PCT/EP94/02865

§ 371 Date: May 6, 1996

§ 102(e) Date: May 6, 1996

[87] PCT Pub. No.: WO95/06965

PCT Pub. Date: Mar. 9, 1995

[30] Foreign Application Priority Data

Sep. 3, 1993 [DE] Germany ............. 43 29 753.6

[51] Int. Cl.$^6$ ............................................. H02K 13/00
[52] U.S. Cl. ................... 310/248; 310/251; 310/252; 310/245; 310/242
[58] Field of Search ........................ 310/248, 252, 310/245, 242, 251

[56] References Cited

U.S. PATENT DOCUMENTS

| | | | |
|---|---|---|---|
| 2,206,366 | 7/1940 | Redmond | 171/323 |
| 3,075,111 | 1/1963 | Starre | 310/248 |
| 3,791,331 | 2/1974 | Dilley | 115/17 |
| 4,800,313 | 1/1989 | Warner et al. | 310/242 |
| 4,924,129 | 5/1990 | Copus | 310/239 |

FOREIGN PATENT DOCUMENTS

| | | |
|---|---|---|
| 0076403 | 4/1983 | European Pat. Off. . |
| 542203 | 5/1921 | France . |
| 417833 | 8/1925 | Germany . |
| 581451 | 7/1933 | Germany . |
| 1613371 | 5/1970 | Germany . |
| 3022991 | 1/1982 | Germany . |
| 3148581 | 6/1983 | Germany . |
| 8500060.4 | 4/1985 | Germany . |
| 3920047 | 1/1991 | Germany . |
| 340975 | 6/1929 | United Kingdom . |
| 2218269 | 11/1989 | United Kingdom . |
| WO8911170 | 11/1989 | WIPO . |

OTHER PUBLICATIONS

Search Report of the German Patent Office for Application No. P4329753.6.

English Translation of the International Preliminary Examination Report for Application PCT/EP94/02865.

*Primary Examiner*—Steven L. Stephan
*Assistant Examiner*—Timothy A. Williams
*Attorney, Agent, or Firm*—J. Gordon Lewis; Thomas N. Twomey

[57] ABSTRACT

This invention relates to a carbon brush for an electric motor. These carbon brushes are guided in tubular brush holders and are pressed against a commutator. Furthermore, the brushes of the present invention include inclined side edges so that the front frontal surface has a trapezoidal cross-section. The consequence thereof is that, when sliding along the commutator, the commutator bars will always support the side edges over the major part of their length. The ratchet effect is thus suppressed.

7 Claims, 2 Drawing Sheets

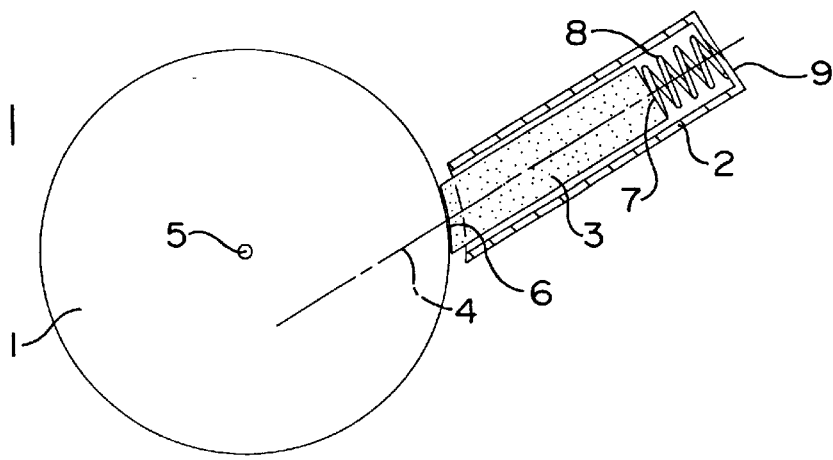
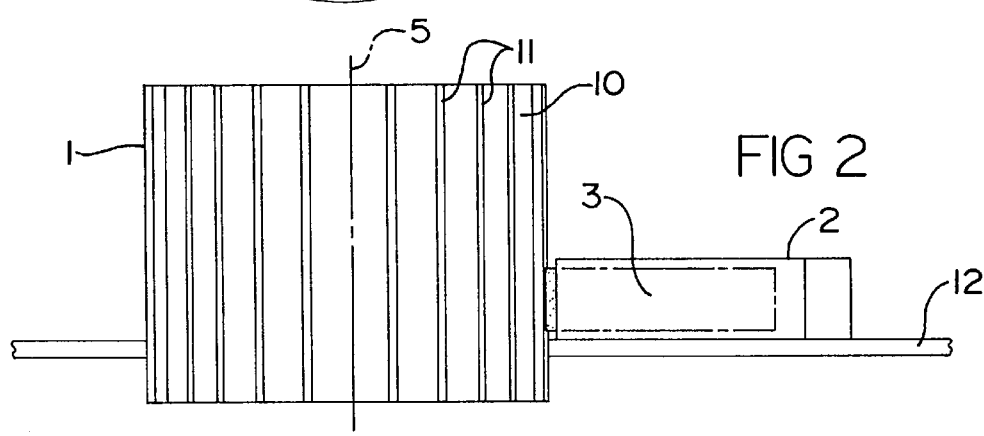
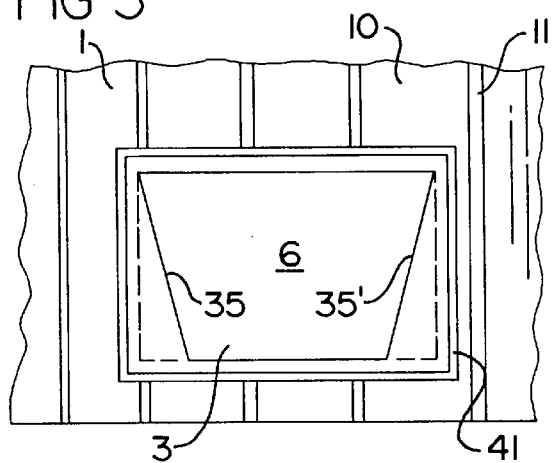
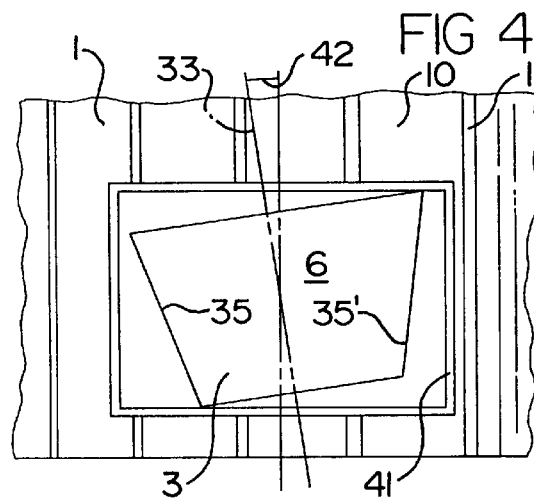
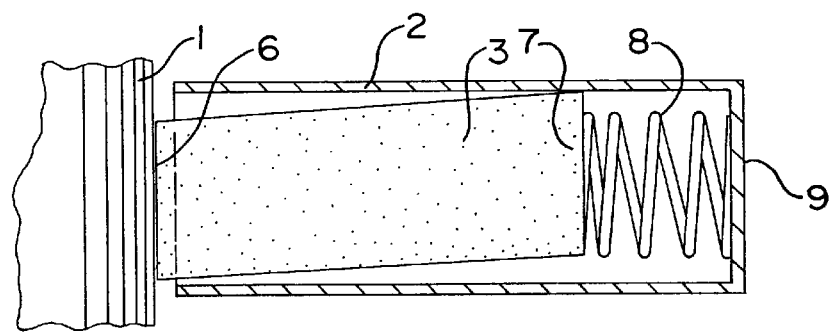

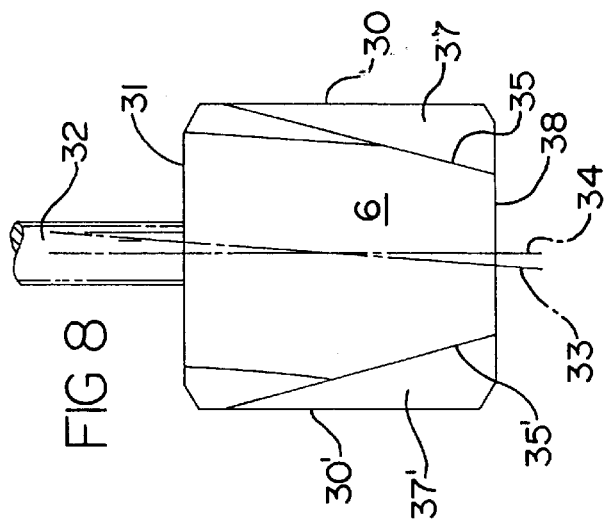
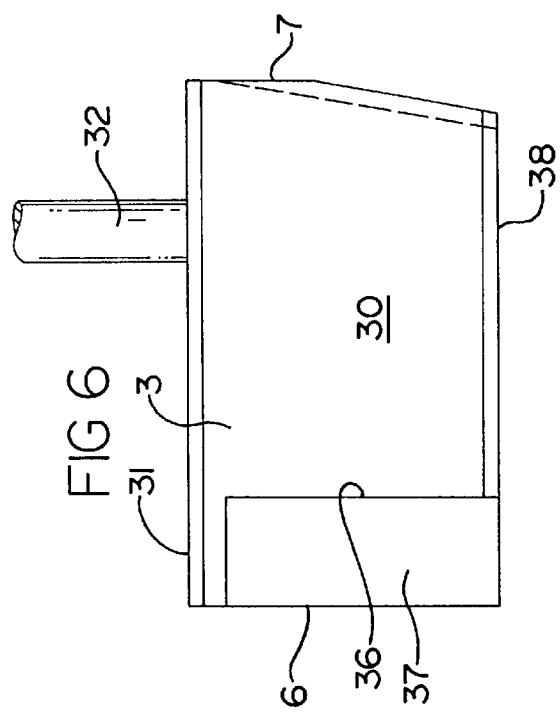
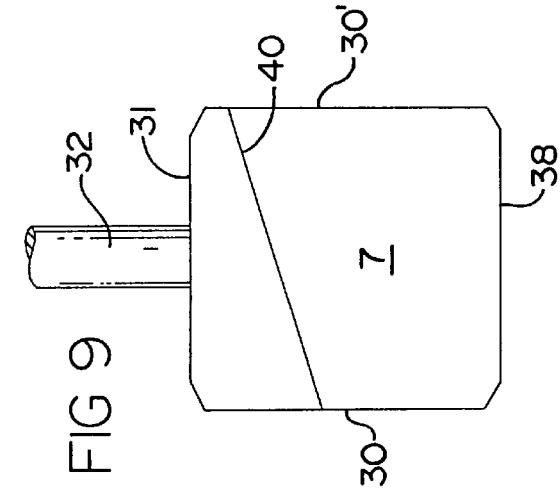
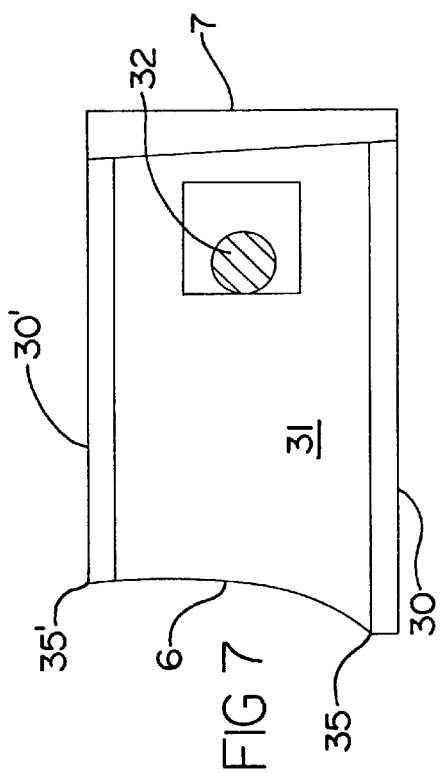

5,808,394

CARBON BRUSH FOR AN ELECTRIC MOTOR

TECHNICAL FIELD

This invention relates to carbon brushes for an electric motor and more particularly relates to carbon brushes having a bar-shaped design and feature an essentially rectangular cross-section.

BACKGROUND OF THE INVENTION

In brush designs, typically one of the ends of the bar has a front frontal surface which is abutted against a commutator. On the other end of the bar, there is a rear frontal surface which supports a spring which presses the front frontal surface against the commutator.

The carbon brush is typically guided in a tubular brush holder the inside cross-section of which is the same as that of the carbon brush itself, with a relatively large play being provided in the regular case. Too small a play would imply excessive precision demands on the manufacture of the brush holder. Generally, the brush holder is mounted on a carbon-brush holder plate extending perpendicularly to the axis of the commutator. The brush holder itself, on its part, stands perpendicularly on the carbon-brush holder plate so that the side surfaces of the carbon brushes extend parallel to the axis of the commutator.

Usually, the circumference of the commutator features several commutator bars separated from one another by slits. The commutator bars and slits extend parallel to the commutator axis. As a result of this arrangement the edge between the front frontal surface of the carbon brush and the side surface of the carbon brush is passed over its entire length over a slit at the same time. With the commutator revolving, this action will be repeated in quick succession. It is easy to see that, like in the case of a ratchet, noises result from this action. At the same time, fluttering movements of the carbon brush will be induced within the brush holder which will likewise produce noises.

It is thus an object of this invention to design the carbon brushes so that as few noises as possible will form when the brushes are used in an electric motor. Thus, the electric motor will become particularly suitable for applications in the automotive industry, e.g., for driving wipers or other independently operating vehicle systems.

In order to accomplish this object, this invention suggests that the outer contour of a cross-section near the front frontal surface be trapezoidal. As a result, the edge between the front frontal surface and the side surface will slope so that, over the major part of its length, the edge will be supported by the respective adjacent commutator bars when overriding a slit. Only a small portion of the edge will actually be over a slit. It is easy to see that the rathet effect known from prior art cannot come up here.

It has been found out that it will be completely sufficient to give only the front part of the carbon brush this design. In the rear part, it is possible to maintain a rectangular cross-section which will ensure that the carbon brush is guided in the brush holder. In general, it will be completely sufficient if about 10% of the length of the carbon brush has a trapezoidal cross-section, with the slope of the side edges becoming less and less towards the rear so that there will be a slow transition from the trapezoidal into the rectangular area.

As already explained, on the one hand, the noise reduction is based on avoiding the ratchet effect as the carbon brush slides over the commutator surface. On the other hand, in this way, the fluttering movements of the carbon brush within the brush holder will be induced only in a more reduced manner. A measure for stopping the remaining fluttering movements and vibrations consists in tilting the carbon brush within the brush holder. This can be done in different ways. One way is to incline the rear frontal surface towards the top and bottom surfaces of the carbon brush, on the one hand, and towards the side surfaces, on the other hand. The force of the spring will then no longer act in a straight line but rather with a slight skew so that a lateral force will be applied which will press the carbon brush against the side walls, or rather into a corner, of the brush holder. A corresponding inclination is also provided for the front frontal surface so that the longitudinal section of the carbon brush has a contour which is approximately like a parallelogram. Tilting the carbon brush within the brush holder will also be achieved by the following measure. The front frontal surface features a cylindrical design in correspondence with the cylindrical shape of the commutator. The axis of the cylindrical shape of the front frontal surface may now be arranged so that it will enclose an angle with a perpendicular on respectively the top and bottom sides of the carbon brush. In consequence of this tilting of the axis of the cylinder contour of the front frontal surface the carbon brush will revolve correspondingly about its longitudinal axis so that the cylinder contour of the front frontal surface will matingly abut on the cylinder surface of the commutator. This will bring about a tilting of the carbon brush within the brush holder whereby fluttering movements will efficiently be stopped.

BRIEF DESCRIPTION OF THE DRAWINGS

FIG. 1 is a cross-section through the arrangement of commutator and carbon brush with tubular brush holder.

FIG. 2 is a side view of commutator and carbon brush.

FIG. 3 shows a development of the commutator surface as well as the contours of the front frontal surface of the carbon brush and of the brush holder.

FIG. 4 likewise, is a developed view.

FIG. 5 is a longitudinal section through the carbon brush.

FIG. 6 is a side view of the carbon brush.

FIG. 7 is a plan view on the top surface.

FIG. 8 is a plan view of the front frontal surface.

FIG. 9 is a plan view of the rear frontal surface.

DETAILED DESCRIPTION OF THE PREFERRED EMBODIMENTS

In FIG. 1, reference numeral 1 denominates a commutator. The same is cylindrical and is located on the shaft of an electric motor. A carbon brush 3 is guided in a tubular brush holder 2. Brush holder and carbon brush each have a rectangular or square cross-section. The brush holder is arranged so that the longitudinal axis 4 of the carbon brush 3 runs at a distance past the axis 5 of revolution of the commutator 1.

The front frontal surface 6 of the carbon brush 3 is abutted against the commutator surface. It has the same cylindrical contour as the commutator. The rear frontal surface 7 of the carbon brush 3 supports a spring 8 the other side of which supports itself on the rear end 9 of the brush holder. The spring 8 presses the carbon brush 3 against the cylinder surface of the commutator 1 so that a good electrically conductive contact is established between the commutator 1 and the carbon brush 3.

FIG. 2 shows a side view. There can be seen the commutator 1 with the commutator bars 10 and the slits 11 arranged therebetween. The commutator bars 10 and the slits 11 extend parallel to the axis 5 of revolution of the commutator 1. Further, it can be seen that the brush holder 2 is arranged on a carbon-brush holder plate 12 arranged perpendicularly to the axis 5 of the commutator 1. That means that the longitudinal axis of the carbon brush 3 extends in a plane perpendicular to the axis 5 of the commutator 1.

FIGS. 6 through 9 show various views of a carbon brush which may be accommodated in a brush holder 2. FIG. 6 shows the view of a side surface of a carbon brush 3. When assembled, this surface is perpendicular to the carbon-brush holder plate 12.

FIG. 7 shows a plan view on the carbon brush and, thus, on the top surface 31 of the carbon brush. The same extends parallel to the carbon-brush holder plate. A stranded conductor 32 protrudes from the top surface 31 of the carbon brush 3. Via the stranded conductor 32, current is conducted to the carbon brush 3 and, via the commutator bars 10, to the armature of the electric motor.

FIG. 8 shows a view of the front frontal surface 6, FIG. 9 showing a view of the rear frontal surface 7.

From the plan view of FIG. 7 it can be seen that the frontal surface 6 is curved in correspondence with the cylinder shape of the commutator. In correspondence with the offset of the brush holder to the axis 5 of the commutator 1 (see FIG. 1), the frontal surface 6 is inclined to the side surface 30.

As revealed by FIG. 8, the axis 33 of the cylindrical curvature of the frontal surface 6 is to be inclined by approx. 3° to a perpendicular 34 towards the top surface 31. The effect of this measure is to be described further below.

At the same time, the side edges 35, 35' are inclined in the transition area between the front frontal surface 6 and the side surfaces 30, 30'. The angle is approx. +15° or −15°, respecticely, to a perpendicular to the top surface 31. Altogether, there will thus result an approximately trapezoidal cross-section of the front surface 6. However, this maximum inclination of approx. 15° only exists in the front surface of a carbon brush not yet ground off. When performing sections lying behind the front surface the inclination of the edges 35, 35' will become less until a cross-section is reached which essentially will be rectangular.

Referring to the condition of the carbon brush when new, the rectangular cross-section will be reached already shortly after the front frontal surface, namely over a length of approx. 10% of the total length of the carbon brush.

This is sketched out by the edge 36 defining the area in which the carbon brush cross-section is trapezoidal. In this way, on both sides of the frontal surface, sloping surfaces 37, 37' are formed which are inclined to the side surfaces 30, 30', respectively, on the one hand, and to the frontal surface 6, on the other hand.

As can be seen from FIG. 5, the rear frontal surface 7 is likewise inclined. It is inclined to the bottom surface 38.

Together with an imaginary perpendicular frontal surface, it encloses an angle of approx. 10°. As can be seen from the plan view of FIG. 7, the rear frontal surface 7 is simultaneously slightly inclined towards a side surface. The direction of this inclination is so that the correspondingly inclined surface of the front frontal surface encloses an angle with the inclined rear frontal surface. Thus, the rear and front frontal surfaces are tilted towards each other in the plan view of FIG. 7.

The tilt of the surface to the bottom surface and the inclination to the side surface cause the upper limiting edge 40 of the sloping surfaces to extend with the perpendicular part of the rear frontal surface 7 obliquely to an imaginary mid-perpendicular.

The carbon brush design described in FIGS. 6 through 9 has the following effect. This can be seen very clearly in FIG. 3 which shows a development of the side surface of the commutator and the there adjacent surfaces of the carbon brush 3 as well as of the brush holder 2. The cross-section of the brush holder 2 is approximately a square the side walls 41 of which extend parallel to the slits of the commutator 1. The carbon brush 3 is guided in the brush holder and abuts with its front frontal surface 6 on the commutator. This surface is trapezoidal as can also be seen from FIG. 8. Consequently, the side edges 35, 35' extend at an angle to the slits 11 between the commutator bars 10. The consequence thereof is that the edges 35, 35' always will be supported over a major part of their length by the commutator bars as can be seen from FIG. 3.

The representation of FIG. 4 corresponds to that of FIG. 3. Illustrated is the result which ensues if the axis 33 of the cylinder contour of the front frontal surface is tilted to a perpendicular 34 towards respectively the top and bottom surfaces of the carbon brush.

The carbon brush will rotate in the brush holder up to where the axis 33 of the curved surface contour of the frontal surface 6 is in conformity with the axis 5 of the commutator. This will only be possible if the carbon brush is tilted around its longitudinal axis by the corresponding angle 42. The consequence thereof, on its part, is that one edge between the side surfaces 30, 30' and respectively the top and bottom surfaces 31, 38 at time abuts against respectively the top and bottom surfaces of the brush holder. Thereby, the carbon brush is locked in the brush holder.

As the bevels of the side surfaces is about 15° and the inclination of the axis is about 3°, the inclination of the side edges 35, 35' to the slits 11 will enlarge somewhat on the one side and will diminish somewhat on the other side. The inclination of the side edge to the commutator bars 10 will thus be kept even in the most unfavourable event.

FIG. 5 is to show the effect of the bevel of the rear frontal surface 7. The carbon brush 3 will adjust itself in the brush holder 2 so that the rear frontal surface 7 stands approximately perpendicularly in the brush holder. As a result, the carbon brush is tilted lengthwise and the front frontal surface 6 which abuts on the commutator is correspondingly bevelled. It is also possible to provide this bevel in the new carbon brush 3 from the start. This procedure will give the carbon brush an altogether paralellogram-type longitudinal section.

The carbon brush is tilted within the brush holder so that the edges between respectively the front and rear frontal surfaces and respectively the top and bottom sides abut on the inside walls of the brush holder. This will result in an additional clamping force which will result in stopping the fluttering of the carbon brush within the brush holder.

I claim:
1. In an electric motor containing a commutator with a plurality of commutator bars separated by slits, a carbon brush, comprising:
    a generally elongated bar-shaped body with
        a front frontal surface on one end thereof, said front frontal surface operatively facing successively adjacent commutator bars of said plurality of commutator bars and being adapted to abut thereon, a rear frontal surface on another end thereof whereon a spring can be supported to operatively press said front frontal surface against said successively adjacent commutator bars of said plurality of commutator bars, and top, bottom and side surfaces, said bar-shaped body having a generally rectangular cross section for a majority of its length, wherein an outer contour of a cross-section through said bar-shaped body near said front frontal surface is transitioned to a trapezoidal form, whereby edges between said front frontal surface and said side surfaces will slope so that said edges over a major part of a length thereof will be operatively supported by said successively adjacent commutator bars when sliding thereacross and overriding said slits, to thereby reduce ratchet-type noise.

2. In an electric motor containing a commutator with a plurality of commutator bars separated by slits, a carbon brush, comprising:

a generally elongated bar-shaped body including
means for engaging adjacent commutator bars of said plurality of commutator bars and for abutting thereon, said engaging means including a front frontal surface on an end of said generally elongated bar-shaped body, a rear frontal surface on another end of said generally elongated bar-shaped body whereon a spring can be supported to operatively press said engaging means against said adjacent commutator bars of said plurality of commutator bars, and top, bottom and side surfaces, said bar-shaped body having a generally rectangular cross section, wherein an outer contour of a cross-section through said bar-shaped body near said front frontal surface is transitioned to a trapezoidal form, whereby edges between said front frontal surface and said side surfaces will slope so that said edges over a major part of a length thereof will be operatively supported by said successively adjacent commutator bars when sliding thereacross and overriding said slits, to thereby reduce ratchet-type noise.

3. A carbon brush as claimed in claim 1, wherein the cross-section of the carbon brush is rectangular or square, respectively, in the area of the rear frontal surface.

4. A carbon brush as claimed in claim 1, wherein the edges and the side surfaces enclose an angle in the range of 10° to 15°.

5. A carbon brush as claimed in claim 1, wherein the rear frontal surface is inclined in the longitudinal direction of the carbon brush.

6. A carbon brush as claimed in claim 1, wherein the longitudinal section through the carbon brush has the shape of a parallelogram.

7. A carbon brush as claimed in claim 1, wherein the front frontal surface has a cylindrical shape, with the axis of the cylinder contour being tilted to a perpendicular towards respectively the top and bottom surfaces of the carbon brush.

* * * * *